United States Patent
Shin (10) Patent No.: US 8,104,909 B2
(45) Date of Patent: Jan. 31, 2012

(54) LIGHT EMITTING MODULE CONNECTING APPARATUS, LIGHT UNIT HAVING THE SAME, AND DISPLAY DEVICE

(75) Inventor: Kyung Ho Shin, Gwangju (KR)

(73) Assignee: LG Innotek Co., Ltd., Seoul (KR)

( * ) Notice: Subject to any disclaimer, the term of this patent is extended or adjusted under 35 U.S.C. 154(b) by 336 days.

(21) Appl. No.: 12/336,101

(22) Filed: Dec. 16, 2008

(65) Prior Publication Data

US 2009/0154139 A1 Jun. 18, 2009

(30) Foreign Application Priority Data

Dec. 18, 2007 (KR) .................... 10-2007-0133131

(51) Int. Cl.
*F21V 23/00* (2006.01)
*F21V 21/00* (2006.01)

(52) U.S. Cl. ....... 362/97.1; 362/29; 362/97.2; 362/97.3; 362/249.02; 362/634

(58) Field of Classification Search .................. 362/29, 362/97.1–97.4, 249.02, 634
See application file for complete search history.

(56) References Cited

U.S. PATENT DOCUMENTS

| | | | | |
|---|---|---|---|---|
| 6,632,003 B2* | 10/2003 | Marquardt et al. | ........... | 362/267 |
| 6,974,221 B2* | 12/2005 | Wu et al. | .......... | 362/29 |
| 7,213,937 B2* | 5/2007 | Tsai | ............... | 362/224 |
| 7,270,467 B2* | 9/2007 | Kim | ............... | 362/634 |
| 7,334,927 B2* | 2/2008 | Lai et al. | ........ | 362/558 |
| 7,339,157 B2* | 3/2008 | Faller | ....... | 250/227.11 |
| 7,604,365 B2* | 10/2009 | Chang | .......... | 362/97.1 |
| 7,658,534 B2* | 2/2010 | Azuma et al. | ................ | 362/634 |
| 2009/0141210 A1* | 6/2009 | Cho et al. | ......... | 349/64 |

* cited by examiner

*Primary Examiner* — Stephen F Husar
*Assistant Examiner* — James Cranson, Jr.
(74) *Attorney, Agent, or Firm* — Birch, Stewart, Kolasch & Birch, LLP (57) ABSTRACT

A light unit and a display device having the light unit are provided. The light unit comprises a plurality of light emitting modules each comprising a board and a light emitting device on the board, a bottom cover under the light emitting modules, a module connecting member that electrically interconnects the light emitting modules using an elastic body and is fixed on the bottom cover, and an optical sheet unit above the light emitting module.

19 Claims, 5 Drawing Sheets

FIG. 10

LIGHT EMITTING MODULE CONNECTING APPARATUS, LIGHT UNIT HAVING THE SAME, AND DISPLAY DEVICE

CROSS-REFERENCE TO RELATED APPLICATIONS

The present application claims priority under 35 U.S.C. 119 to Korean Patent Application No. 10-2007-0133131 (filed on Dec. 18, 2007), which is hereby incorporated by reference in its entirety.

BACKGROUND

The present disclosure relates to a light emitting module connecting apparatus, a light unit having the same, and display device.

A display device generally used comprises a cathode ray tube (CRT), a liquid crystal display (LCD) device using an electric field and optical effect, a plasma display panel (PDP) using gas discharge, and electro luminescence display (ELD) using an electric field light emitting effect. Among these displays, studies for the LCD device are under active development.

The LCD device is used for a monitor of a laptop computer, a monitor of a desktop computer, and a large scale information display device.

Since the LCD device is a device of a light receiving characteristic displaying an image by controlling an amount of light illuminated to an LCD panel, it illuminates light onto the LCD panel using a backlight unit.

SUMMARY

Embodiments provide a light emitting module connecting apparatus comprising a module connecting member interconnecting light emitting modules, a light emitting unit having the same, and a display device.

Embodiments provide a light emitting module connecting apparatus comprising a module connecting member that interconnects light emitting modules using a spring manner, a light emitting unit having the same, and a display device.

Embodiments provide a light emitting module connecting apparatus comprising a module connecting member that is integrated with a guide pin that interconnects light emitting modules using a spring manner, a light emitting unit having the same, and a display device.

Embodiments provide a light emitting module connecting apparatus comprising a module connecting member that electrically interconnects adjacent light emitting modules by elastically pressing end portions of the adjacent light emitting modules, a light emitting unit having the light emitting module connecting apparatus, and a display device.

An embodiment provides a light emitting module connecting apparatus comprising: a contact spring portion electrically interconnecting between a light emitting modules while pressing a part of the light emitting modules with predetermined elastic force; and a holder protruding downward from the contact spring portion.

An embodiment provides a light unit comprising: a plurality of light emitting modules comprising a board and a light emitting device on the board; a bottom cover under the light emitting modules; a module connecting member that electrically interconnects the adjacent light emitting modules using a spring manner and is fixed on the bottom cover; and an optical sheet unit above the light emitting module.

An embodiment provides a display device comprising: a plurality of light emitting modules comprising a board and a light emitting device on the board; a bottom cover under the light emitting modules; a module connecting member that electrically interconnects the light emitting modules using an elastic body and is fixed on the bottom cover; an optical sheet unit above the light emitting module; and a display panel above the optical sheet unit.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
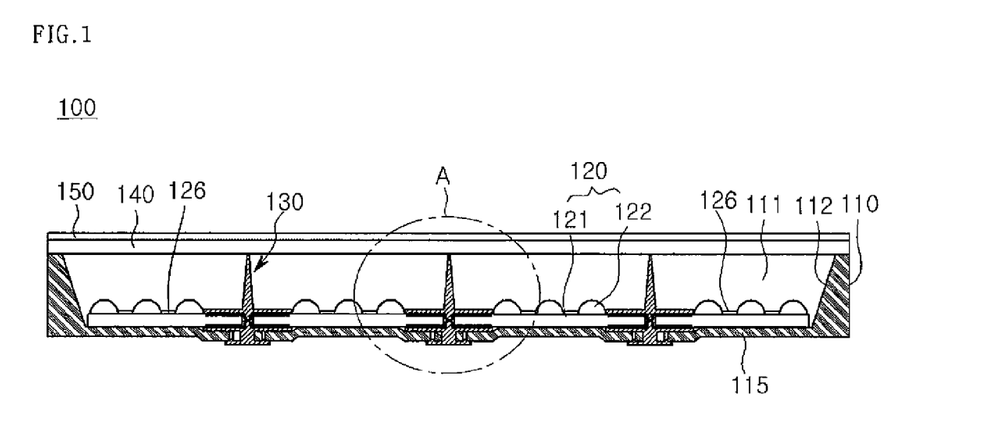
FIG. 1 is a side sectional view of a display device according to a first embodiment.

FIG. 1 is a cross-sectional view of a display device according to a first embodiment.

Referring to FIG. 1, a display device 100 comprises a bottom cover 110, a light emitting module 120, a first module connecting member 130, an optical sheet unit 140, and a display panel 150.

The bottom cover 110, light emitting module 120, first module connecting member 130, and optical sheet unit 140 may define a light unit.

The bottom cover 110 may be formed of metal such as, for example, aluminum (Al), magnesium (Mg), zinc (Zn), titanium (Ti), tantalum (Ta), hafnium (Hf), and niobium (Nb), and the like. However, these materials do not limit the present invention. Further, the bottom cover 110 may be formed in a chassis or housing through an injection molding process.

The bottom cover 110 is provided with a groove 111 formed in a pot shape, a container shape, a base tube shape, or the like. An inner surface 112 defining an inner wall of the groove 111 may be vertical or inclined with respect to a bottom surface. Here, the inner surface 112 may be coated with a reflective material (e.g., Ag) or a reflective sheet. The bottom cover 110 may not be provided with the groove 111 and/or the inner surface 112. That is, the bottom cover 110 is not specifically limited.

A bottom portion 115 of the bottom cover 110 may be flat or provided with protrusions and grooves.

A plurality of light emitting modules 120 and at least one first module connecting member 130 are disposed in the grooves 111 of the bottom cover 110.

The light emitting module 120 comprises a board 121 and light emitting devices 122. A plurality of boards 121 are arranged in at least one row and/or column. One row and column is realized by an electrical connection of the boards 121.

A module unit of the light emitting module 120 may be one board 121. However, the present disclosure is not limited to this.

The light emitting devices 122 are disposed on the board 121. The light emitting devices 122 are arranged in at least one row and/or column or in a zigzag pattern. However, the present disclosure is not limited to this.

The light emitting devices 122 may be color light emitting diodes (LEDs) or white LEDs. The white LED may be realized by a color LED chip and an LED using phosphors, an LED using a plurality of color LED chips (e.g., red/green/blue LED chips). The color LED may be realized by combining LED chips having different colors, ultraviolet LED chips, and phosphors.

The light emitting device 122 may be mounted on the board 121 in the form of a chip type or a package type. As a light source of the light emitting module 120, a light emitting device, cold cathode fluorescent lamp, or a combination of the light emitting device and the cold cathode fluorescent lamp may be used.

A reflective sheet 126 or reflective material may be coated on the board 121. The reflective sheet 121 is provided with insertion holes (not shown) in which the light emitting devices are inserted. The first module connecting member 130 is formed of resin material such as PPA or an insulation material. The first module connecting member 130 comprises a contact spring structure.

The first module connecting members 130 are fixed between the light emitting modules 120 to electrically interconnect the light emitting modules 120 and prevent the light emitting modules 120 from moving.

A reflective material such as aluminum is coated on a portion of the first module connecting member 130. However, the present invention is not limited to this.

An optical sheet unit 140 is disposed above the light emitting modules 120 and the display panel 150 is disposed on the optical sheet unit 140.

The first module connecting member 130 is fixed to the bottom portion 115 of the bottom cover 110 to support the undersurface of the optical sheet unit 140.

The optical sheet unit 140 comprises a diffusing sheet (not shown) and/or a prism sheet (not shown). The diffusion sheet diffuses the light emitted from the light emitting devices 122 and the prism sheet collets the diffused light on the light emitting region. The prism sheet may selectively comprise a horizontal or/and vertical prism sheets and one or more sheets of illumination enhancing films, and the like.

The display panel 150 displays information using the light emitted from the optical sheet unit 140. The display panel 150 may be, for example, an LCD panel. However, the present invention is not limited to this.

Figure 2:
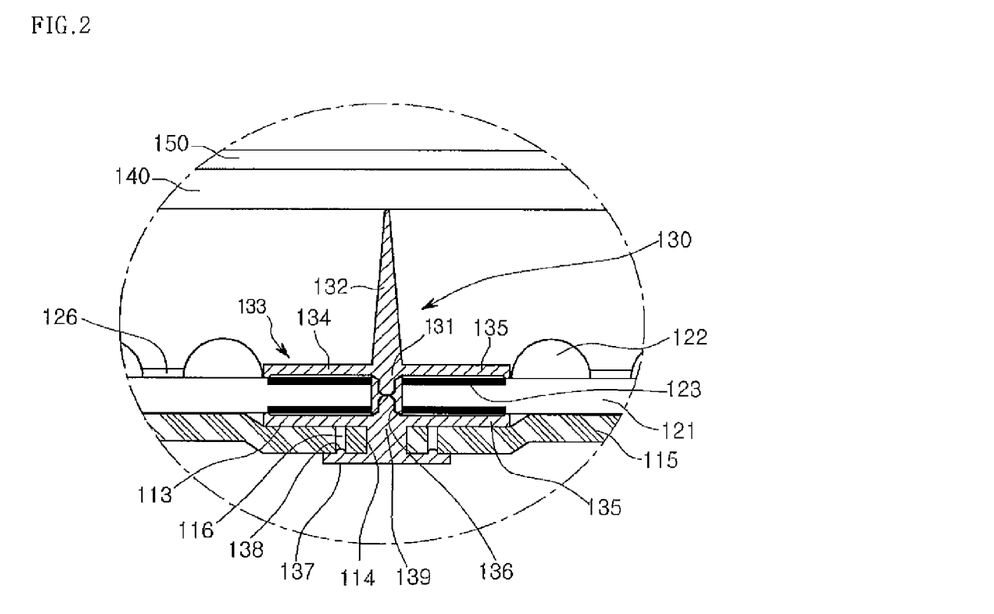
FIG. 2 is an enlarged view of a portion A of FIG. 1.

FIG. 2 is an enlarged view of a portion A of FIG. 1. The following will describe the module connecting member with reference to FIGS. 1 and 2.

Referring to FIGS. 1 and 2, the bottom portion 115 of the bottom cover 110 is provided with a receiving groove 113, a holder hole 114, and fixing protrusion grooves 116.

The first module connecting member 130 comprises a guide pin 132, a contact spring portion 133, and a holder 139. The guide pin 132, contact spring portion 133, and holder 139 are integrally formed of resin material through an injection molding process.

The receiving groove 113 of the bottom portion 115 is formed on the holder hole 114. A lower portion of the contact spring portion 133 is received in the receiving groove 113 of the bottom portion 115. The holder hole 114 is located at a center region of the first module connecting member 130 and sized to receivable the holder 139 of the first module connecting member 130.

The fixing protrusion grooves 116 are formed at both sides of the holder hole 114 in a circular shape or a polygonal shape. The fixing protrusion grooves 116 may be provided in the form of a hole or a groove.

The guide pint 132 is located on an upper portion of the first module connecting member 130, the contact spring portion 133 is located at the middle portion of the first module connecting member 130, and the holder 139 is located on a lower portion of the first module connecting member 130.

The guide pin 132 is formed above the contact spring portion 133 and protrudes in a form of a circular cone shape, a polygonal cone shape, a circular column shape, and a polygonal column shape, and the like. An upper end of the guide pint 132 is formed in a pin shape or a hemispherical shape. The present disclosure is not limited to this configuration.

The guide pint 132 supports the optical sheet unit 140 to prevent the optical sheet unit 140 from drooping.

The contact spring portion 133 comprises a central boss 131, first and second module guide protrusions 134 and 135 branched off from the boss 131 to both sides, and contact springs 136 disposed on respective inner surfaces of the first and second module guide protrusions 134 and 135 and contacting each other.

The first and second module guide protrusions 134 and 135 are branched off from upper and lower portions of the both sides of the boss 131 toward the modules and formed in, for example, a " ⊃ " and " ⊂ " shapes.

The lower portions of the first and second module guide protrusions 134 and 135 are disposed in the receiving groove 113 of the bottom cover 110. A gap of the first module guide protrusion 134 is in parallel with the board 121. A gap of the second module guide protrusion 135 is in parallel with the board 121. The gap of the first module guide protrusion 134 and the second module guide protrusion 135 may be corresponded to the board 121 thickness. In this case, end portions of the boards 121 are slidably inserted in the respective inner portions of the first and second module guide protrusions 134 and 135.

The contact springs 136 are formed in the respective inner portions of the respective first and second module guide protrusions 134 and 135 and are connected to each other.

The contact springs 136 may be formed on upper and/or lower portions of the respective inner portions of the first and second module guide protrusions 134 and 135. These locations correspond to the contact terminals 123 of the boards 121.

The contact springs 136 press the end portions of the boards 121 downward and upward in the inner portions of the first and second module guide protrusions 134 and 135. Namely, when the boards 121 are inserted into the inner portions of the first and second module guide protrusions 134 and 135, the contact springs 136 presses the connecting terminals 123 formed on the end portions of the boards 121 and are electrically connected to the connecting terminals 123.

The connecting terminals 123 are formed on the end portion of the board 121 of the light emitting module 120. The connecting terminals 123 are a circuit pattern and formed on a top surface of the board 121 or on both the top surface and undersurface of the board 121. The connecting terminals 123 are arranged in a width direction of the board 121 and the number of the connecting terminals 123 may vary in accordance with a driving manner or a kind of the LED chip.

The contact springs 136 of the contact spring portion 133 are arranged to correspond to the connecting terminals of the board 121.

The holder 139 is shaped to extend downward from the boss 131 of the contact spring portion 133. A fixing plate 137 is formed on a lower end of the holder 139.

The fixing plate 137 extends from a lower end of the holder 139 horizontally outward. The fixing plate 137 closely contacts an undersurface of the bottom portion 115 of the bottom cover 110. Fixing protrusions 138 are formed on opposite end portions of the fixing plate 137 and protrude upward. The fixing protrusions 138 are engaged with the fixing protrusion grooves 116 of the bottom portion 115 of the bottom cover 110.

Here, the fixing plate 137 and the contact spring portion 133 are respectively disposed on undersurface and top surface of the bottom portion 115 of the bottom cover 110.

Although the holder 139 is described such that it is inserted into the holder hole 114 and fixed by rotating, the holder 139 may be variously modified. For example, a lower end portion of the holder 139 may be formed using a hooking manner, a screw-coupling manner.

Figure 3:
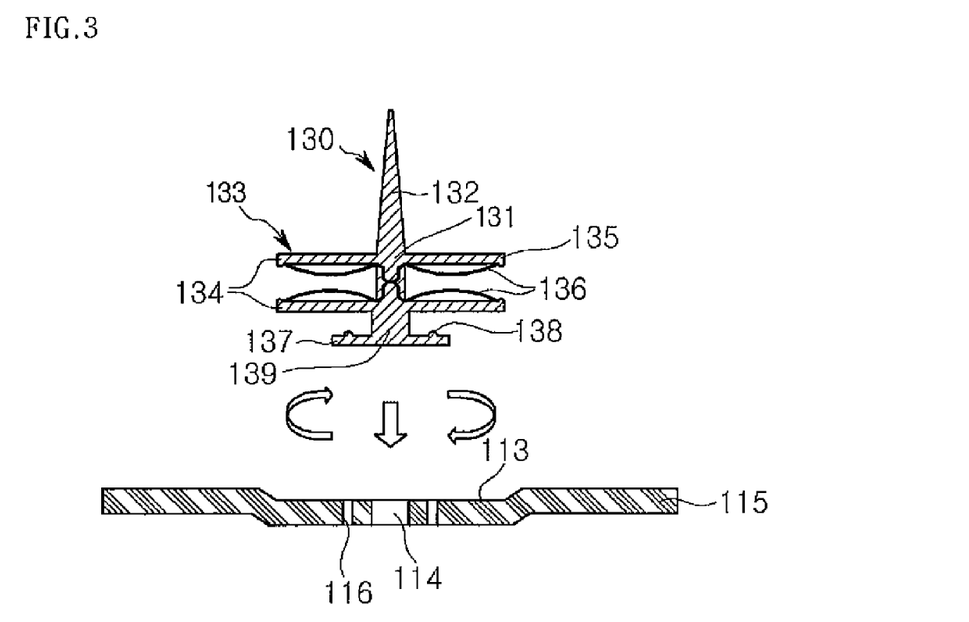
FIG. 3 is an exploded view of a first connecting module and a bottom cover of FIG. 1.
Figure 4:
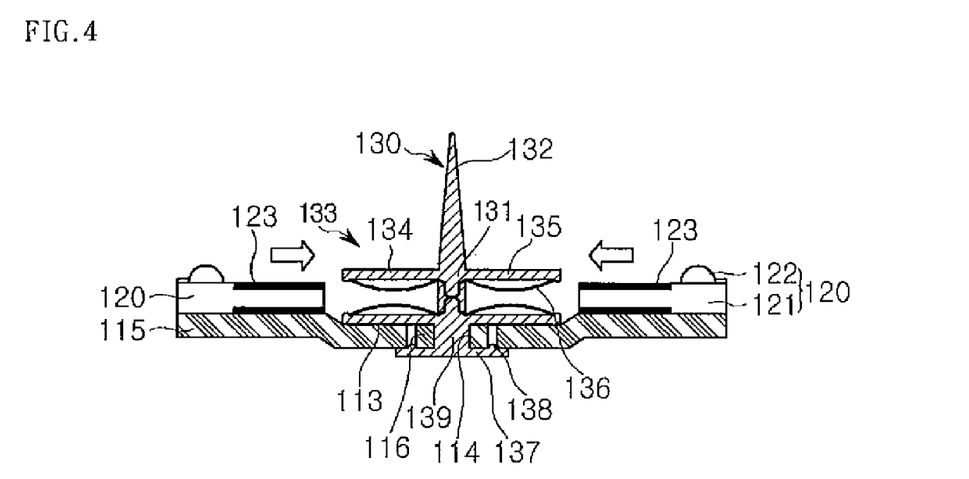
FIG. 4 is a view illustrating a state where the first module connecting member is coupled to the bottom cover of FIG. 3.
Figure 5:
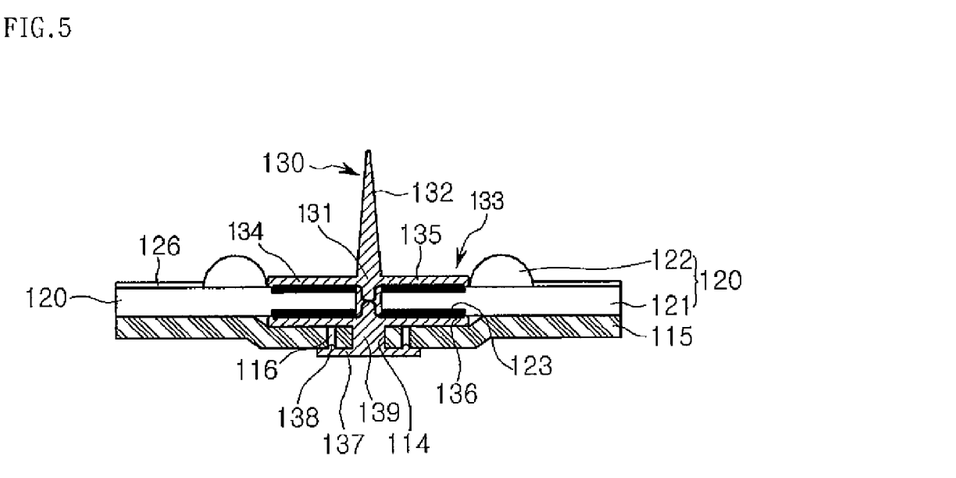
FIG. 5 is a view illustrating a state where the first module connecting member is coupled to the light emitting module of FIG. 4.

FIGS. 3 through 5 are views illustrating a coupling order of the first module connecting member according to the embodiment of FIGS. 1 and 2. In more detail, FIG. 3 is a view illustrating a state before the first module connecting member is connected, FIG. 4 is a view illustrating a state where the first module connecting member is coupled to the bottom cover, and FIG. 5 is a view illustrating a state where the first module connecting member is coupled to the light emitting module.

Referring to FIG. 3, the holder 139 of the first module connecting member 130 is adjusted to correspond to the holder hole 114 of the bottom portion 115 of the bottom cover 110. The holder hole 114 is shaped and sized such that the holder 139 and the fixing plate 137 can be inserted therein. For example, the size of the holder hole 114 in the frontward and backward direction is sized such that the fixing plate 137 can be inserted based on the holder hole 114 and the size in the leftward and rightward direction is sized such that the holder 139 can be inserted based on the holder hole 114.

The first module connecting member 130 is rotated about an axis of the guide pin 132 by 90° and, in this state, the fixing plate 137 of the holder 139 is inserted through the holder hole 114 and is rotated by +90° or −90°. Accordingly, the first module connecting member 130 is connected to the bottom cover as shown in FIG. 4. That is, the first module connecting member 130 is not specifically limited to the rotated degree.

Referring to FIG. 4, the fixing plate 137 of the first module connecting member 130 closely contacts the undersurface of the bottom portion 115 of the bottom cover 110 and the fixing protrusions 138 protruding upward from the fixing plate 137 are engaged with the fixing protrusion grooves 116 of the bottom portion 115.

The lower portions of the first and second module guide protrusions 134 and 135 closely contacts on the receiving groove 113 of the bottom portion 115. Therefore, the first and second module guide protrusions 134 and 135 are disposed in parallel with the boards 121 of the light emitting modules 120.

The first and second module guide protrusions 134 and 135 of the first module connecting member 130 are coupled as shown in FIG. 5 when the boards 121 of the light emitting modules 120 are inserted.

As shown in FIGS. 4 and 5, the first module connecting member 130 is fixed on the bottom portion 115 of the bottom cover 110, and the light emitting modules 120 are coupled to both sides of the first module connecting member 130.

The contact springs 136 of the contact spring portion 133 electrically contact the connecting terminals 123 while pressing the connecting terminals 123. The contact springs 136 electrically interconnects the boards 121 inserted into the first and second module guide protrusions 133 and 134. In addition, the contact springs 136 presses the end portions of the light emitting modules 120 upward and/or downward and thus the removal of the light emitting modules 120 can be prevented.

The first module connecting member 130 electrically interconnects the adjacent light emitting modules 120 without performing a separate soldering process and prevents the light emitting modules 120 from moving.

The first module connecting member 130 interconnects the light emitting modules 120 and fixes the light emitting modules 120 on the bottom cover 110. In addition, since the first module connecting member 130 can supports the optical sheet unit 140, the assembling process can be simplified and there may be no need to use separate guide pins and connectors.

Figure 6:
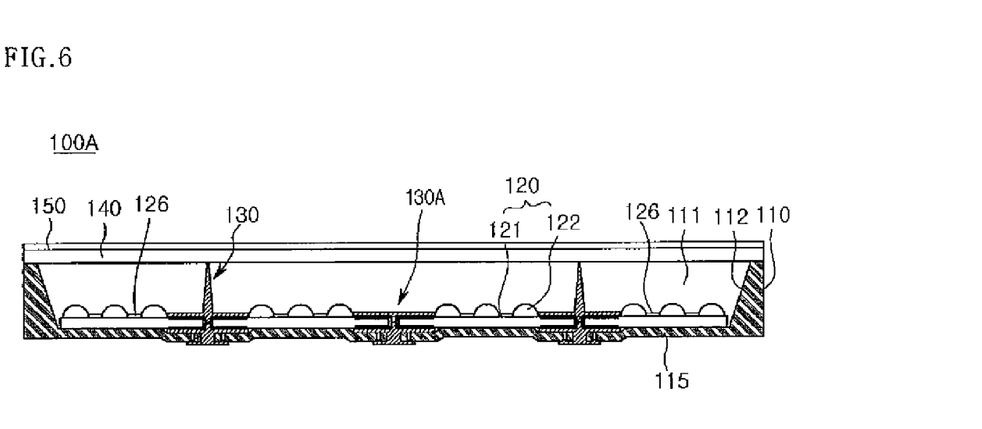
FIG. 6 is a side sectional view of a display device according to a second embodiment.

FIG. 6 is a side sectional view of a display device according to a second embodiment. In the description of the second embodiment, components identical to those of the foregoing embodiment will refer to the foregoing embodiment and descriptions thereof will be omitted.

Referring to FIG. 6, a display device 110A is designed such that light emitting modules 120 are interconnected by first and second connecting members 130 and 130A.

The first module connecting member 130 refers to the foregoing embodiment and a detailed description thereof will be omitted herein.

The second connecting member 130A does not comprise a guide pin and is coupled between the light emitting modules 120 in the form of the contact spring type.

The first module connecting members 130 are disposed at locations where they can effectively support the optical sheet unit 140 and the second module connecting member 130A are disposed at locations where the first module connecting members 130 are not disposed.

Figure 7:
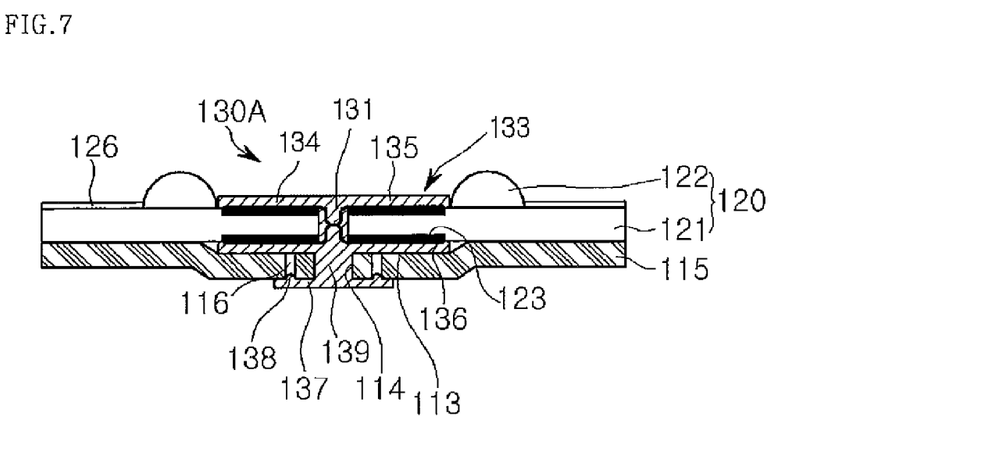
FIG. 7 is a sectional view illustrating a state where a second module connecting member of FIG. 6 is coupled.

FIG. 7 is a view illustrating a coupling state of the second module connecting member of FIG. 6.

Referring to FIG. 7, the second module connecting member 130A comprises a contact spring portion 133 and a holder 139 and formed of a resin or insulation material such as PPA through an injection molding process. In addition, a reflective material is coated or attached on a top surface of the contact spring portion 133.

The contact spring portion 133 is disposed between the adjacent light emitting modules 120 and electrically interconnects adjacent boards 121.

In addition, the contact spring portion 133 presses the end portions of the boards 121 upward and/or downward to prevent the boards 121 from moving.

The holder 139 is coupled to a bottom portion of a bottom cover to support the contact spring portion 133.

The first and second module connecting member 130 and 130A interconnects a plurality of light emitting modules 120 through a contact manner and thus there is no need to use a separate soldering process. The first and second module connecting members 130 and 130A can effectively fix the light emitting modules 120 and can be made to be slim. Therefore, the first and second module connecting members 130 and 130A do not interfere with the light emitted.

In the second embodiment, the module connecting member 130A may comprise a guide pin and a contact spring portion. In this case, the boards may be coupled to the bottom cover by screws.

Figure 8:
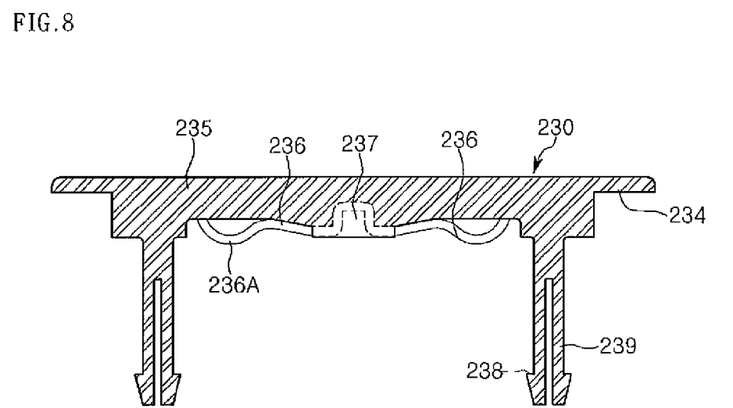
FIG. 8 is a view of a third module connecting member according to a third embodiment.
Figure 9:
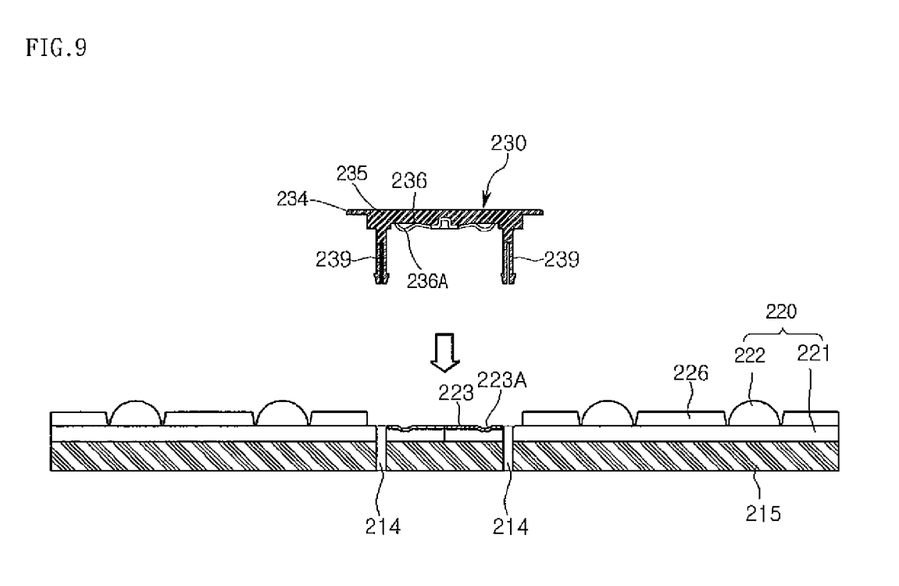
FIG. 9 is a view illustrating a state before the third module connecting member of FIG. 8 is coupled.
Figure 10:
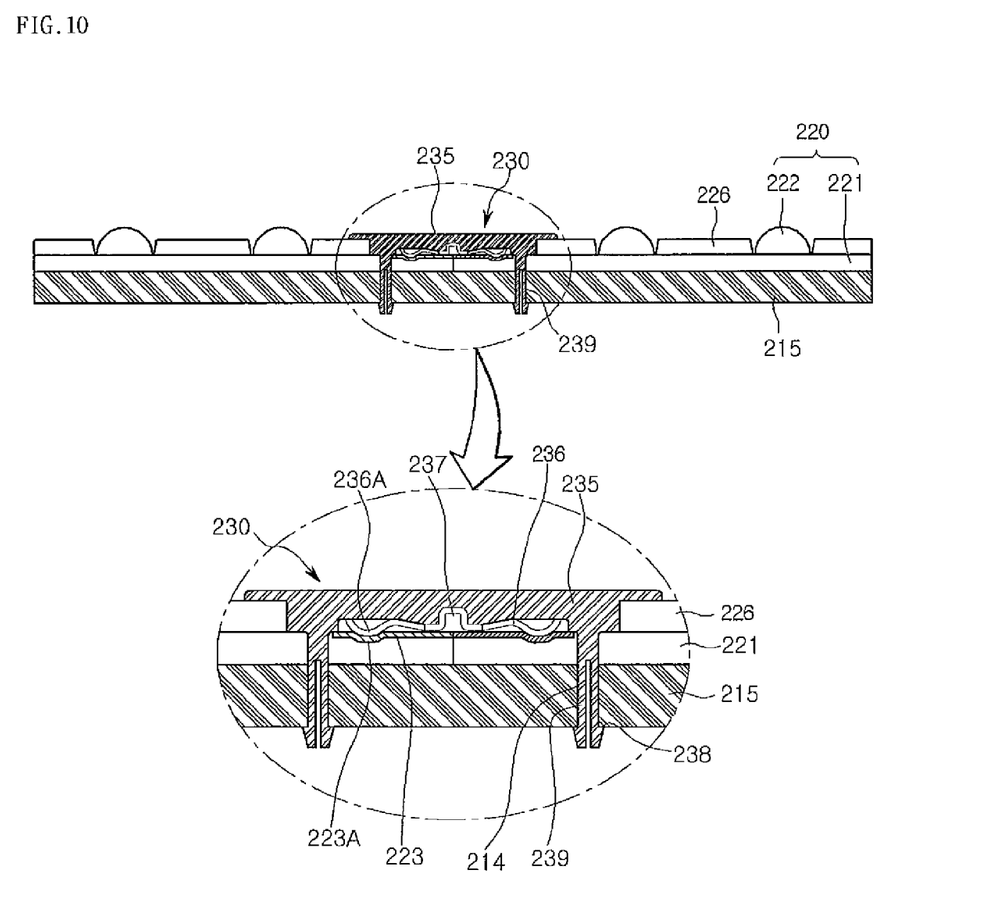
FIG. 10 is a view illustrating a state where the third module connecting member of FIG. 8 is coupled.

FIGS. 8 through 10 are views of a third module connecting member according to a third embodiment.

FIG. 8 is a side sectional view of a third module connecting member and FIGS. 9 and 10 are views illustrating a coupling process of the third module connecting member.

Referring to FIG. 8, a third module connecting member 230 is shaped such that legs protrude from both sides of a plate. That is, the third module connecting member 230 comprises a contact spring portion 235 and a holder 239. The third module connecting member 230 may be formed of a resin material such as PPA through an injection molding process. However, the material is not specifically limited.

The contact spring portion 235 is formed in a plate shape. A reflective material may be deposited on a top surface of the contact spring portion 235. A contact spring 236 is coupled to an undersurface of the contact spring portion 235.

A center of the contact spring 236 is fixed and both sides of the contact spring 236 are formed of contact members 236A having predetermined elastic force.

Seat guide protrusions 234 may be formed on opposite ends of the contact spring portions 235.

The holder 239 is a hook type and may be formed with one or a plurality of legs. A hook step 238 is formed on an end portion of the holder 239.

Referring to FIG. 9, the third module connecting member 230 is coupled between a plurality of light emitting modules 220. The holder 239 of the third module connecting member 230 corresponds to the holder holes 214 formed in a bottom portion 215 of the bottom cover.

Here, the holder hole 214 may be formed through the bottom portion 215 of the bottom cover and the board 221 of the light emitting module 220.

Connecting terminals 223 of the boards 221 correspond to the contact spring 236 of the contact spring portion 230. The numbers of the contact springs 236 and the connecting terminals 223 may vary in accordance with a driving type or a kind of the LED chip.

Referring to FIG. 9, the holder 239 of the module connecting member 230 is inserted into the holder holes 214 of the bottom portion 215 and the hook step 238 of the holder 239 is hooked on an undersurface of the bottom portion 215. Accordingly, the module connecting member 230 is coupled to the bottom portion 215 of the bottom cover. A groove may be formed on the undersurface of the bottom portion 215 and the hook step 238 of the holder 239 may be received in the groove.

The contact spring portion 235 is coupled between the plurality of light emitting modules 220. The contact spring 236 electrically contacts the connecting terminals 223 of the boards 221 while pressing the connecting terminals. The contact members 236A of the contact spring 236 contact the grooves 223A of the connecting terminals 223. Therefore, the contact spring 236 and the connecting terminals 223 may contact each other in a protrusion/groove shape. This contact structure may improve the electrical contact reliability The seat guide protrusions 234 formed on the opposite ends of the contact spring portion 235 press end portions of the reflective sheet 236.

The third module connecting member 230 may be used together with the first module connecting member or independently used.

According to the embodiments, by providing the second and third connecting members, the electrical connection and fixing between the light emitting modules can be simultaneously realized and thus there is no need to use a separate connector and a screw, thereby reducing the number of processes.

The display device according to the embodiment can interconnect the light emitting modules by selectively using the first, second, and/or third module connecting members. The module connecting members having the guide pin structure are basically distributed between the light emitting modules and the module connecting members not having the guide pin are properly mixed and disposed between the light emitting modules.

Any reference in this specification to "one embodiment," "an embodiment," "example embodiment." Etc., means that a particular feature, structure, or characteristic described in connection with the embodiment is comprised in at least one embodiment of the invention. The appearance of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting module connecting apparatus comprising:
   a contact spring portion electrically interconnecting between light emitting modules while pressing a part of the light emitting modules with predetermined elastic force;
   a holder protruding downward from the contact spring portion and supporting the contact spring portion; and
   a guide pin protruding on the contact spring portion.

2. The light emitting module connecting apparatus according to claim 1, wherein the contact spring portion comprises:
   a first and second module guide protrusions into which at least the part of the light emitting modules are inserted; and
   a contact springs that are formed on one sides of inner circumferences of the first and second module guide protrusions and connected to each other.

3. The light emitting module connecting apparatus according to claim 2, wherein the number of the contact springs are identical to the number of connecting terminals of the light emitting module and the contact springs are formed on and/or under an inner portion of each of the first and second module guide protrusions.

4. The light emitting module connecting apparatus according to claim 1, wherein the contact spring portion comprises a contact springs pressing the light emitting module downward and electrically contacting to the light emitting module.

5. The light emitting module connecting apparatus according to claim 1, wherein the holder protrudes downward from a center or both sides of the contact spring portion.

6. The light emitting module connecting apparatus according to claim 5, wherein the holder comprises at least one of a fixing step, a screw thread, and a hook.

7. A light unit comprising:
   a plurality of light emitting modules comprising a board and a light emitting device on the board;
   a bottom cover under the light emitting modules;
   a module connecting member that electrically interconnects the adjacent light emitting modules using a spring manner and is fixed on the bottom cover; and
   an optical sheet unit above the light emitting module.

8. The light unit according to claim 7, wherein the module connecting member comprises:
   a contact spring portion that presses connecting terminals of the boards and electrically contacts the connecting terminals; and
   a holder that protrudes downward from the contact spring portion and is coupled to the bottom cover.

9. The light unit according to claim 8, wherein the module connecting member comprises a guide pin formed in a cone-shape or a column-shape extending upward from the contact spring portion.

10. The light unit according to claim 8, wherein the contact spring portion comprises:
    a first and second module guide protrusions into which a part of the boards are inserted; and
    a contact springs that are formed on one sides of inner circumferences of the first and second module guide protrusions and connected to each other.

11. The light unit according to claim 8, wherein the contact spring portion comprises contact springs pressing the light emitting module downward and electrically interconnecting the boards.

12. The light unit according to claim 8, wherein the contact spring portion corresponds to a line of the connecting terminals of the board.

13. The light unit according to claim 8, wherein the bottom cover is provided with a holder hole in which the holder is inserted and fixing protrusion grooves formed at both sides of the holder hole, wherein the holder comprises a fixing plate inserted through the holder hole and contacting an undersurface of the bottom cover and fixing protrusions formed on both end portions of the fixing plate and engaged with the fixing protrusion grooves.

14. The light unit according to claim 8, wherein the bottom cover is provided at a top surface thereof with a receiving groove in which a lower portion of the contact spring portion is received.

15. The light unit according to claim 7, wherein a plurality of the module connecting members are disposed and at least one of the module connecting members comprises a guide pin supporting the optical sheet unit.

16. The light unit according to claim 7, comprising a reflective member on the light emitting module.

17. A display device comprising:
    a plurality of light emitting modules comprising a board and a light emitting device on the board;
    a bottom cover under the light emitting modules;
    a module connecting member that electrically interconnects the light emitting modules using an elastic body and is fixed on the bottom cover;
    an optical sheet unit above the light emitting module; and
    a display panel above the optical sheet unit.

18. The display device according to claim 17, wherein the module connecting member comprises:
    a contact spring portion pressing end portions of a plurality of boards and electrically interconnecting the boards;
    a holder extending downward from the contact spring portion and coupled to the bottom cover; and
    a first module connecting member having a guide pin supporting the optical sheet unit.

19. The display device according to claim 17, comprising a reflective sheet on the light emitting modules.

* * * * *